United States Patent
Langadi (10) Patent No.: US 9,645,964 B2
(45) Date of Patent: May 9, 2017

(54) SYSTEM AND METHOD FOR IMPROVING ECC ENABLED MEMORY TIMING

(71) Applicant: Texas Instruments Incorporated, Dallas, TX (US)

(72) Inventor: Saya Goud Langadi, Karnataka (IN)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 96 days.

(21) Appl. No.: 14/695,595

(22) Filed: Apr. 24, 2015

(65) Prior Publication Data

US 2015/0227488 A1    Aug. 13, 2015

Related U.S. Application Data

(63) Continuation of application No. 13/531,002, filed on Jun. 22, 2012, now Pat. No. 9,021,170.

(30) Foreign Application Priority Data

Jun. 29, 2011  (IN) ............................ 2202/CHE/2011

(51) Int. Cl.
*G06F 13/00* (2006.01)
*G06F 13/42* (2006.01)
*G06F 13/364* (2006.01)
*G06F 11/10* (2006.01)

(52) U.S. Cl.
CPC ...... *G06F 13/4221* (2013.01); *G06F 11/1008* (2013.01); *G06F 11/1044* (2013.01); *G06F 13/364* (2013.01); *G06F 13/00* (2013.01)

(58) Field of Classification Search
CPC ............................. G06F 13/364; G06F 13/00
USPC .................................................. 710/104, 110
See application file for complete search history.

(56) References Cited

U.S. PATENT DOCUMENTS

| 5,426,739 | A | * | 6/1995 | Lin | ..................... G06F 13/4027 |
| | | | | | 710/305 |
| 5,566,304 | A | * | 10/1996 | Regal | .................. G06F 13/4243 |
| | | | | | 710/105 |
| 6,393,506 | B1 | * | 5/2002 | Kenny | .................. G06F 13/362 |
| | | | | | 710/107 |
| 6,434,654 | B1 | * | 8/2002 | Story | .................... G06F 13/385 |
| | | | | | 709/235 |
| 6,785,755 | B1 | * | 8/2004 | Holm | .................... G06F 13/364 |
| | | | | | 710/110 |
| 6,848,063 | B2 | * | 1/2005 | Rodeheffer | ........... G06F 11/106 |
| | | | | | 714/5.1 |
| 7,174,401 | B2 | * | 2/2007 | Stuber | .................. G06F 13/364 |
| | | | | | 710/110 |
| 7,234,011 | B2 | * | 6/2007 | Chae | ..................... G06F 13/405 |
| | | | | | 710/110 |

(Continued)

*Primary Examiner* — Faisal M Zaman
(74) *Attorney, Agent, or Firm* — John R. Pessetto; Charles A. Brill; Frank D. Cimino (57) ABSTRACT

A pipeline communication system includes a master and a plurality of slaves configured to communicate with each other. Each of the plurality of slaves includes a memory, and is configured to generate a first ready signal and a second ready signal. The first ready signal is configured to be provided only to the master and the second ready signal is configured to be provided only to each of the plurality of slaves. The second ready signal is generated independent of the error check in each of the plurality of slaves.

4 Claims, 5 Drawing Sheets

(56) References Cited

U.S. PATENT DOCUMENTS

| | | | | |
|---|---|---|---|---|
| 7,346,723 B2* | 3/2008 | Kim | ................ | G06F 1/3203 |
| | | | | 710/110 |
| 7,373,450 B2* | 5/2008 | Kamegawa | ......... | G06F 13/4022 |
| | | | | 710/110 |
| 7,406,551 B2* | 7/2008 | Ishihara | ............ | G06F 13/4208 |
| | | | | 710/104 |
| 7,506,089 B2* | 3/2009 | Cho | ................ | G06F 13/4022 |
| | | | | 710/110 |
| 9,021,170 B2* | 4/2015 | Langadi | ............ | G06F 11/1008 |
| | | | | 710/110 |
| 2004/0236887 A1* | 11/2004 | Kim | ................ | G06F 13/00 |
| | | | | 710/110 |
| 2005/0281283 A1* | 12/2005 | Beecher | ............ | H04L 5/1423 |
| | | | | 370/449 |
| 2009/0307401 A1* | 12/2009 | Feng | ................ | G06F 13/4031 |
| | | | | 710/110 |

\* cited by examiner

SYSTEM AND METHOD FOR IMPROVING ECC ENABLED MEMORY TIMING

This application is a Continuation of prior application Ser. No. 13/531,002, filed Jun. 22, 2012, now U.S. Pat. No. 9,021,170, granted Apr. 28, 2015, and This application claims priority from India Provisional Application, application number 2202/CHE/2011 filed Jun. 29, 2011, entitled "A METHOD TO IMPROVE ECC ENABLED MEMORY TIMING IN SOC BY ADDING AN ADDITIONAL INTERFACE BETWEEN AHB SLAVES", which is incorporated herein by reference in its entirety.

TECHNICAL FIELD

Embodiments of the disclosure relate to error correction code (ECC) enabled memory in a pipeline communication system.

BACKGROUND

In typical pipeline communication system, for example the advanced microcontroller bus architecture high performance bus (AHB) protocol system, there may be resources such as memory or peripheral (referred to as slaves) which are accessible by multiple or single master on system such as CPU and DMA. All the masters in system may not follow the same bus protocol to fetch data or write data to resources.

AHB is well known pipelined protocol and one the important signal on AHB protocol is HREADY. Slave uses HREADY signal to detect or to decide when to process a new access (for example, read or write to/from the memory). Further, the HREADY signal is driven by the slave to indicate status of a current access. When ECC error is detected upon access then slaves have a mechanism in the AHB protocol to respond to the master with an ERROR-RESPONSE. An error response is generated by modulating the HREADY signal and the HREP signal as per the AHB protocol.

In the system where the memory resources are ECC or Parity enabled i.e memory data is protected by ECC or parity then slave need to check for the correctness of the data when the data is read from the memory. Upon a read access from the master, if slave detects an error in the data being read from the memory then slave responds with ERROR-RESPONSE. Due to this, the state of HREADY cannot be determined a cycle before the access is complete as data from the memory is available in the last cycle of the data phase of the access. In the last cycle of the data phase, HREADY should overwritten by the ECC or Parity check logic to force HREADY to either low or high. HREADY will be forced to low if the errors are found. Hence a significant delay is introduced by memory access time and ECC check logic.

SUMMARY

This Summary is provided to comply with 37 C.F.R. §1.73, requiring a summary of the invention briefly indicating the nature and substance of the invention. It is submitted with the understanding that it will not be used to interpret or limit the scope or meaning of the claims.

An example embodiment provides a pipeline communication system. The system includes a master and a plurality of slaves configured to communicate with each other. Each of the plurality of slaves includes a memory, and is configured to generate a first ready signal and a second ready signal. The first ready signal is configured to be provided only to the master and the second ready signal is configured to be provided only to each of the plurality of slaves. The second ready signal is generated independent of the error check in each of the plurality of slaves.

Another example embodiment provides a method use in a pipeline communication system. The method includes generating a first ready signal and a second ready signal from each of the plurality of slaves, wherein plurality of slaves configured to communicate with a master and vice versa, each of the plurality of slaves includes a memory. The first ready signal is configured to be provided only to the master and the second ready signal is configured to be provided only to each of the plurality of slaves, wherein the second ready signal is generated independent of the error check in each of the plurality of slaves.

Other aspects and example embodiments are provided in the Drawings and the Detailed Description that follows.

DETAILED DESCRIPTION OF THE EMBODIMENTS

Figure 1:
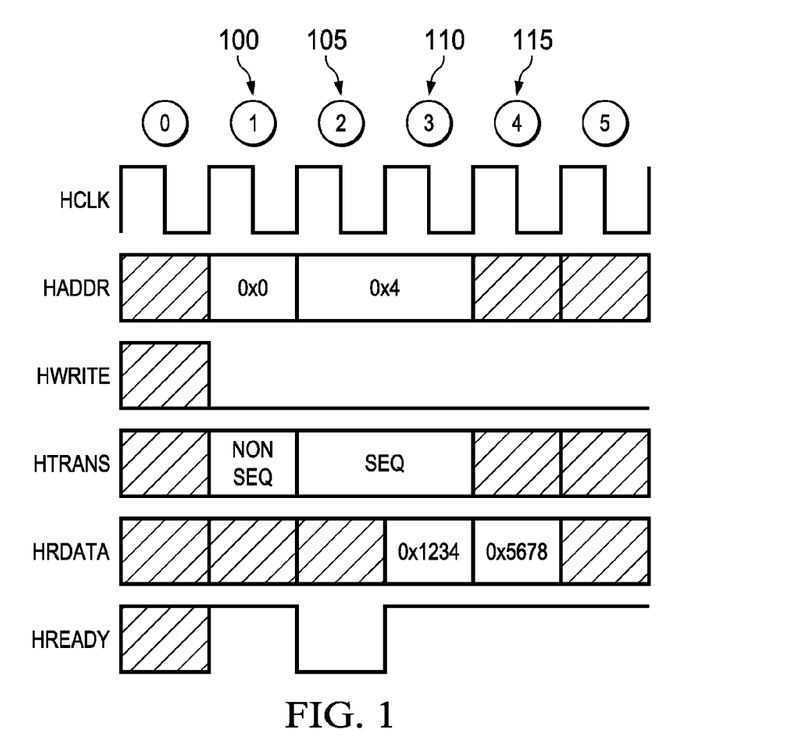
FIG. 1 illustrates a timing diagram for back to back read access on AHB system.

FIG. 1 illustrates a timing diagram for back to back read access on AHB system where first access takes two cycles to complete the access where are the next access takes only a cycle. In AHB protocol an access is divided in to two phases namely, address phase and data phase. Address phase of new access overlaps with the data phase of previous access. However, a new request is processed or detected by slave only when previous access is complete. Address phase is extended when HREADY is low. HREADY low indicates that previous access is not completed. On AHB system HREADY is the signal which control these phases.

Referring now to FIG. 1, cycle1 (100) is the address phase of the read access to address 0x0. All the required control information such as size of the access, type of access is available in the address phase. In this cycle, slave detects the read access to address 0x0 since HREADY is high. Slave also makes decision on whether to force the HREADY to low or high during the cycle 2 (105) which is data phase of the read access to address 0x0, slave to force low on HREADY if it is not able to provide the data in the next cycle.

Cycle2 (105) is the data phase of the read access to address 0x0. Control information will not be available during the data phase of the read access to address 0x0. In this example, it is assumed that slave is unable to give the read data back to the master hence HREADY is forced to low. The decision to force HREADY low or high is made in cycle 1 (100) hence HREADY is generated from flop.

Address and control information for next read access to address 0x4 is placed during cycle 2 (105), but slave will ignore this access since HREADY is low, master will continue to provide the address and control information until HREADY is high.

Cycle 3 (110) is an extended data phase of read access to address 0x0 and is the extended address phase of the read access to address 0x4. In this cycle HREADY is forced to high by the slave to indicate to the master or slave that read access to address 0x0 is completed. Slave will detect the new read access to address 0x4 as this is end the address phase of read access to address 0x4. Cycle4 (115) is the data phase the read access to 0x4.

AHB protocol also supports a mechanism in which slave can indicate master if there are any error in processing the access and it is called ERROR-RESPONSE. In such cases, the master can take corrective action. An ERROR-RESPONSE is generated by modulating the HREADY and HRESP signal as per the AHB protocol. ERROR-RESPONSE is two cycle response in which HREADY=low and HRESP=high during the first cycles and HREADY= HRESP=high in next cycle.

In the system where the memory resources are ECC or Parity enabled, i.e. memory data is protected by ECC or parity then slave needs to check for the correctness data when data is read from the memory. Upon a read access from the master, if slave detects an error in the data being read from the memory then slave responds with ERROR-RESPONSE. Due to this the state of HREADY cannot be determined a cycle before the access is complete as data from the memory is available in the last cycle of the data phase of the access. In the last cycle of the data phase, HREADY should overwritten by the ECC or Parity check logic to force HREADY to either low or high, will be forced to low if the errors are found.

Figure 2:
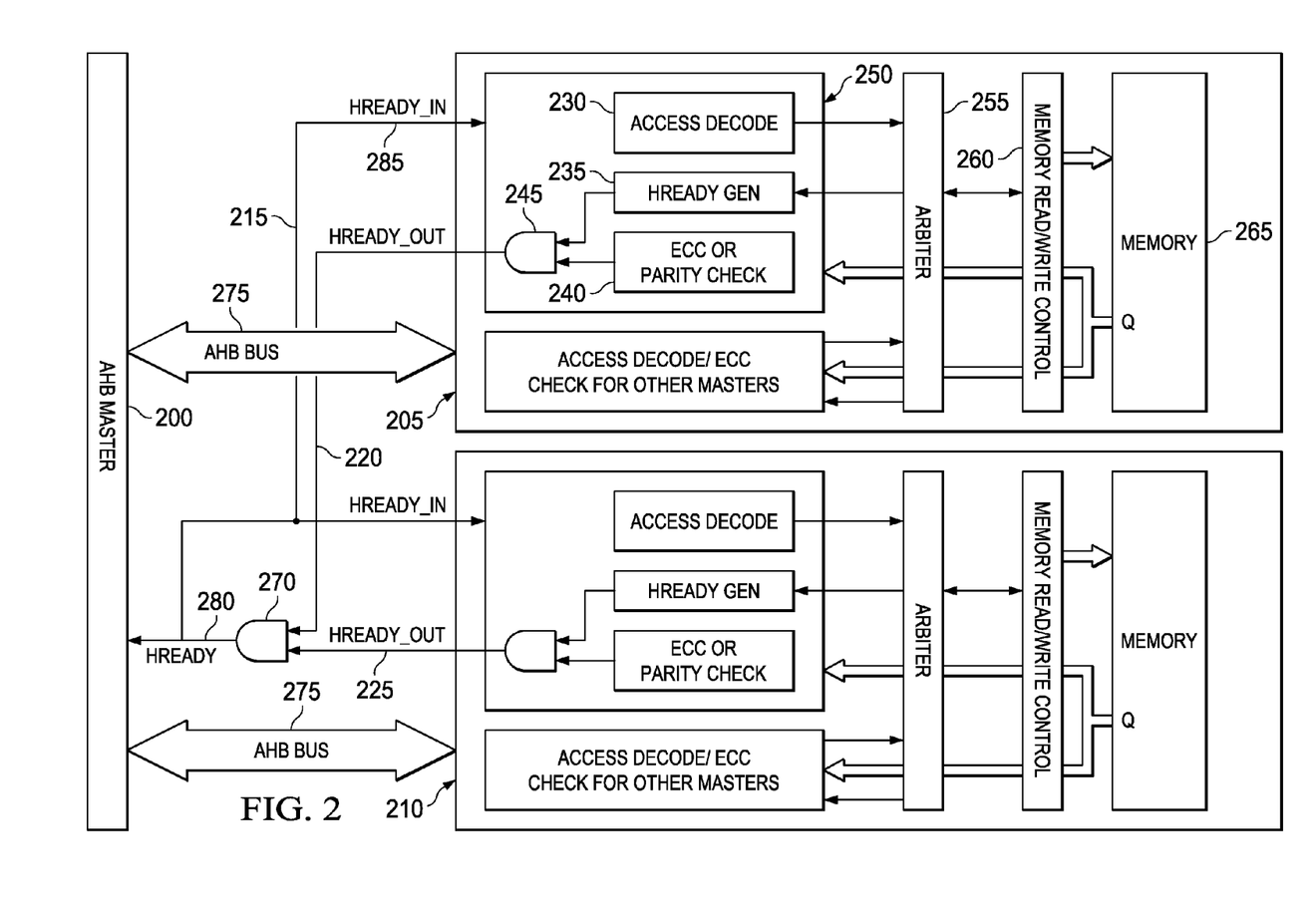
FIG. 2 illustrates the connectivity between a plurality of AHB slaves and its AHB master.

FIG. 2 illustrates the connectivity between AHB slaves and its AHB master. It is assumed that the AHB master is configured to communicate with two slaves. AHB master (200) is connected to its slaves through AHB BUS (275), AHB BUS (275) has all the control and data information except the HREADY. Logic which generates HREADY (280) is explicitly shown in FIG. 2. Two slaves 205 and 210 are assumed to be memory resources for which ECC or Parity protection is enabled.

Each slave generates a HREADY_OUT, and 220 and 225 are HREADY_OUT of slaves 205 and 210 respectively. HREADY_OUT from is logically "ANDed" (270) and fed back to the slaves.

In one embodiment each slave is connected to multiple masters. Each slave includes several sub modules. Access decode 230 module decodes the control signals and HREADY_IN 285 then makes request to arbiter 255 to get access to read/write control 260 and memory (265). HREADY GEN (235) is one of the sources for HREADY_OUT based on the grant status of given request from the arbiter. ECC check module (240) checks for errors in the data read from memory and it is one of source for HREADY_OUT. The AND gate (245) merges two sources to generate final HREADY_OUT.

When slave is memory and it is ECC or parity enabled, then HREADY generation is also dependent on ECC check which will impact SOC performance significantly.

As explained above, access decode is dependent on HREADY_IN generation. Critical paths for this operation are now explained. Critical path1 is across the slaves. The critical path 1 is from slave 205 memory access time, to ECC or parity check (240) on the memory Data on slave 205, to HREADY generation (235) based on the ECC or parity check on slave 205, to slave 210 access decode module, to slave 210 arbitration, to slave 210 read/write control logic, and finally to slave 210 memory (265) request.

Critical path 2 is within slave. The critical path 2 is from slave 210 memory access time, to ECC or parity check (240) on the memory Data on slave 210, to HREADY generation (235) based on the ECC or parity check on slave 210, to slave 210 access decode module, to slave 210 arbiter, to slave 210 read/write control logic, and finally to slave 210 memory (265) request.

Various embodiments solve the timing bottleneck as explained above on HREADY by adding two additional control signals which are compliant with the AHB protocol. They are HREADY_OUT (first ready signal), HREADY_OUT_TO_SLAVE (second ready signal) and ABORT_ACCESS. Functionality of each of these signals is explained now. It is noted that various embodiments are applicable in a system where at least one of the master following AHB protocol.

Figure 3:
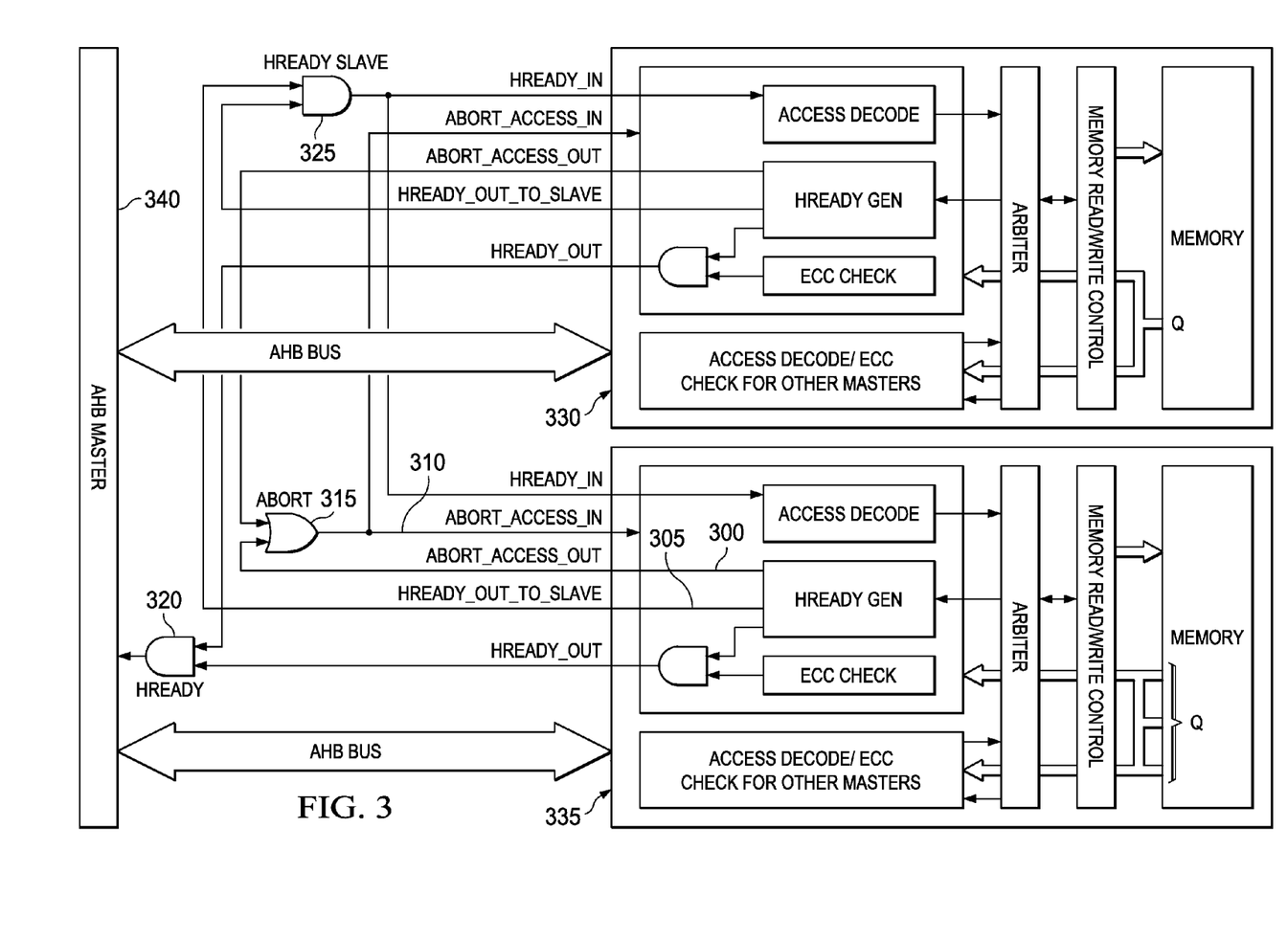
FIG. 3 illustrates AHB connectivity with additional control signals in accordance with an embodiment.

FIG. 3 illustrates AHB connectivity with additional control signals in accordance with an embodiment. FIG. 3 includes two slaves 330 and 335, configured to communicate with the AHB master 340. Each slave includes a memory, memory read/write control, arbiter, access decode, HREADY GEN and ECC check modules. These modules are similar to those illustrated in FIG. 2 in connection and operation and is not repeated for the sake of convenience. HREADY_OUT and HREADY_OUT_TO_SLAVE are generated in response to completion of an operation in the system. In one embodiment, HREADY input (output of AND gate 320) to master is not modified and is implemented adhering to AHB protocol. Additional outputs HREADY_OUT_TO_SLAVE (305) and ABORT_ACCESS_OUT (300) are added. It is noted that the HREADY_OUT is configured to be provided only to the master and the HREADY_OUT_TO_SLAVE is configured to be provided only to each of the plurality of slaves. In an embodiment, HREADY_OUT_TO_SLAVE is generated independent of the error check in each of the plurality of slaves and is generated only from the HREADY GEN module in each of the slaves.

It is noted that HREADY_OUT_TO_SLAVE (305) is not affected by the ECC or parity check, it only depends on arbitration logic. This makes HREADY to master and HREADY_OUT_TO_SLAVE not equivalent. HREADY_IN of slave is controlled by the HREADY_OUT_TO_SLAVE instead of HREADY_OUT (first ready signal). HREADY_IN is generated by logically ANDing (325) the HREADY_OUT_TO_SLAVE from each slave.

In case of errors on data read from the memory, HREADY_OUT_TO_SLAVE (305) is not driven low. Due to this other slaves which are decoding the HREADY_IN will detect the new access although current access is not complete (that is HREADY_OUT of the slave is low). This new access is a pre-mature access and it should be aborted as data phase of previous access is not completed and ERROR-RESPONSE should be generated. In other words, a pre-mature access is decided if HREADY_OUT and HREADY_OUT_TO_SLAVE are not in a same logic state.

To indicate the pre-mature access, a signal ABORT_ACCESS_OUT is generated by the slave. Signal ABORT_ACCESS_OUT (300) from each slave are logically ORed and fed back to all the slaves and is connected to new input port ABORT_ACCESS_IN on slave. ABORT_ACCESS_OUT (300) is generated in following cycle of pre-mature access. A pre-mature access on slave can be a read or write access. If it is a write access then ABORT_ACCESS_IN should be used to prevent the write from happening. This is because the write-data from the pre-mature access is not yet provided by the master as the master 340 is still extending the data-phase of previous read access. If it is a read access, then data from the pre-mature access will be available in following cycle; then ABORT_ACCESS_IN should be used prevent data checking on the read-data. If premature access is pending then pending accesses should be aborted.

In one embodiment, by implementing logic on critical path cycle time is reduced, and it is completely independent of memory access time and ECC or parity check. Memory access time and ECC or parity check are major components of critical path. This is further illustrated using the critical paths as follows. Critical path1 is across the slaves. Critical path1 includes from slave 335 access decode module to arbiter to read/write control logic and to memory. Critical path 2 is within slave. Critical path 2 includes slave 335 access decode module to arbiter, to read/write control logic and to memory. Using one embodiment, the overall system performance is improved by around 66% on a 65 nm CMOS technology node. It is noted that the improvement may vary based on technology and memory access times. In one embodiment the system illustrated in FIG. 3 is in an integrated circuit. In other embodiment the memory of each of the plurality of slaves 330 and 335 is implemented outside the integrated circuit.

Figure 4:
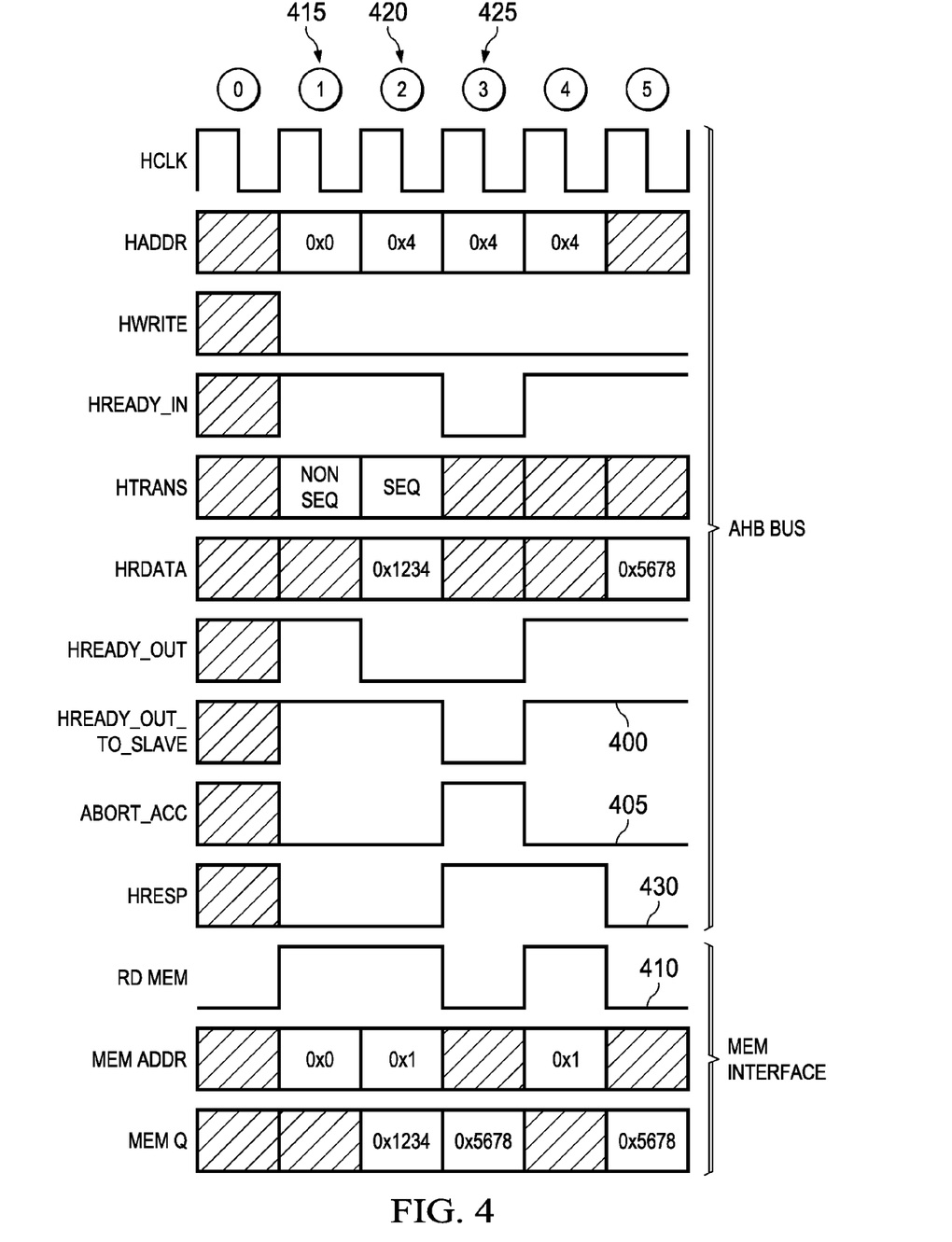
FIG. 4 illustrates the timing diagram of back to back read accesses where errors are detected in the first read access, in accordance with an embodiment.

FIG. 4 illustrates the timing diagram of back to back read accesses where errors are detected in the first read access, in accordance with an embodiment. Different cycles are explained now.

Cycle 1: Read access to memory is issues for address 0x0.

Cycle 2: Read data from memory is available and errors are detected. HREADY_OUT is driven low by the slave, however HREADY_OUT_TO_SLAVE is not driven low (400) as it is independent of errors in the data. As the other slave or same slave will be waiting for the HREADY_IN to go high to detect the new access which is in the pipeline that is read access to address 0x4. Since HREADY_OUT_TO_SLAVE is being decoded to detect new access, the slave will issue a read access to address 0x4, it is a premature access (405) as previous access is not completed.

Cycle 3: ABORT_ACCESS_OUT is generated by the slave to indicate to the other slaves that access must be aborted if a pre-mature access was issued. HRESP is will forced to '1' (430) to indicate to the master that error is occurred in completing the first read access. Slave will abort the read access (410) which was issued in cycle 2.

Figure 5:
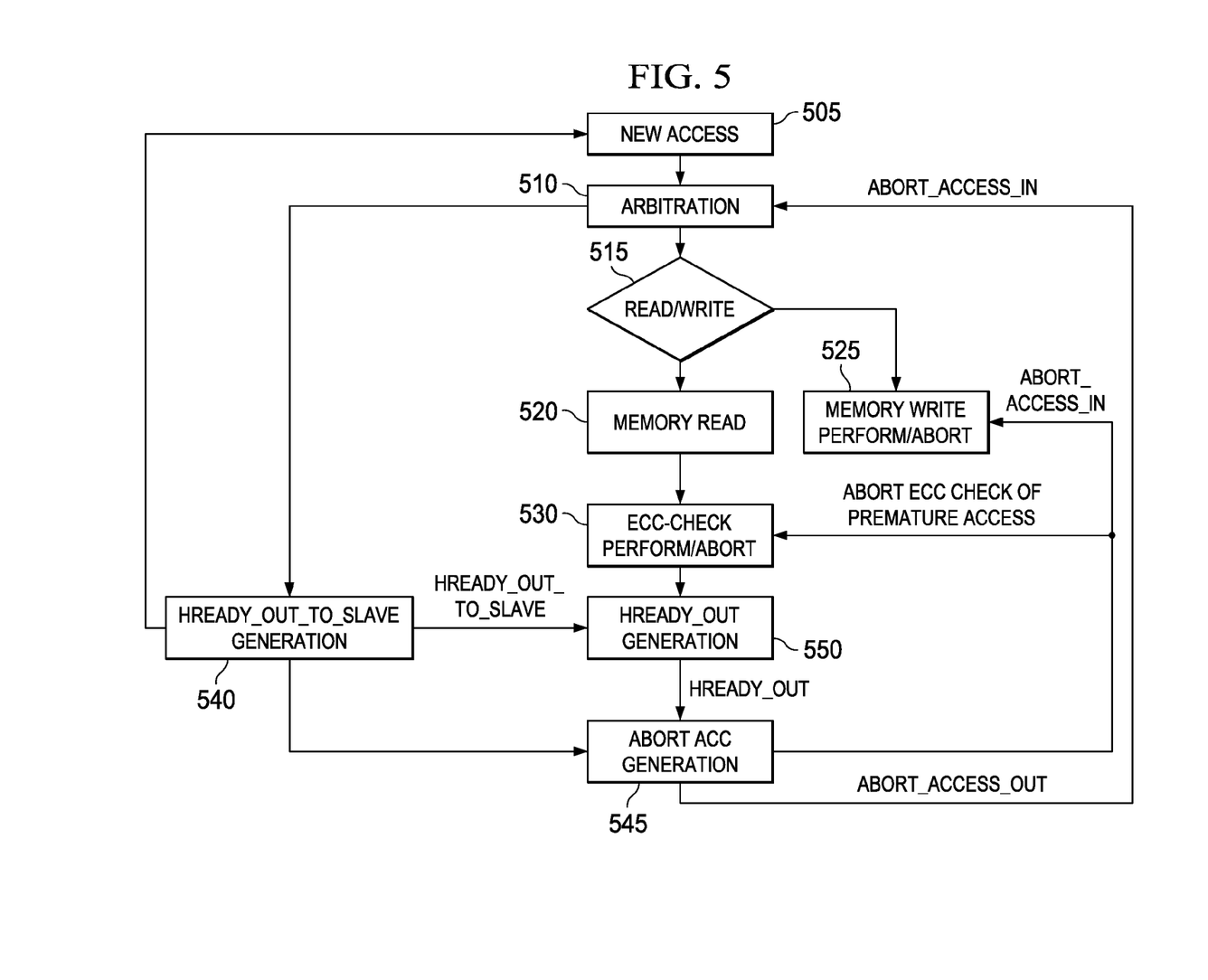
FIG. 5 is a flow diagram illustrating an embodiment.

FIG. 5 illustrates a flow diagram according to an embodiment. A new access is received at step 505. At step 510, the arbitration logic receives the new access and the ABORT_ACCESS_IN (already explained in FIG. 3). At step 510, a new access can either go to a pending state or a granted state. If the ABORT_ACCESS_IN signal is active, then the new access is discarded, and it is in pending state. If the new access is not aborted, the access goes to step 515 where a read/write control decision is made. If the access is a write access, then depending on the ABORT_ACCESS_IN, write operation to memory will be either allowed or blocked at step 525. If it is a read access, at step 520, the ECC check on the read data will be disabled at step 530. An output of the ECC check is provided to step 550. At step 550, an output of step 540 which is HREAD_OUT_TO_SLAVE and the output of the ECC check (530) are received, and the HREADY_OUT signal is generated. The HREADY_OUT is provided to step 545 which receives the HREADY_OUT signal and the HREADY_OUT_TO_SLAVE signal and if there is a mismatch in the state of two signals, the ABORT_ACCESS_OUT signal is generated. It is noted that the new access is generated based on HREADY_OUT_TO_SLAVE signal unlike the HREADY_OUT signal as per the AHB protocol.

The forgoing description sets forth numerous specific details to convey a thorough understanding of the invention. However, it will be apparent to one skilled in the art that the invention may be practiced without these specific details. Well-known features are sometimes not described in detail in order to avoid obscuring the invention. Other variations and embodiments are possible in light of above teachings, and it is thus intended that the scope of invention not be limited by this Detailed Description, but only by the following Claims.

What is claimed is:

1. A pipeline communication system comprising:
a master and a plurality of slaves configured to communicate with each other, each of the plurality of slaves comprising a memory, and being configured to generate a first ready signal and a second ready signal, wherein the first ready signal is configured to be provided only to the master and the second ready signal is configured to be provided only to each of the plurality of slaves, wherein the second ready signal is generated independent of an error check in each of the plurality of slaves;
wherein each of the plurality of slaves generates an abort signal in response to a state when the first ready signal and the second ready signal are not in a same logic state, wherein the abort signal is provided back to the plurality of slaves and wherein each of the plurality of slaves aborts the operation in response to the abort signal.

2. A pipeline communication system comprising:
a master and a plurality of slaves configured to communicate with each other, each of the plurality of slaves comprising a memory, and being configured to generate a first ready signal and a second ready signal, wherein the first ready signal is configured to be provided only to the master and the second ready signal is configured to be provided only to each of the plurality of slaves, wherein the second ready signal is generated independent of an error check in each of the plurality of slaves;
wherein the first ready signal and the second ready signal are generated in response to completion of an operation in the system; and
wherein the first ready signal from each of the plurality of slaves is logically combined and is provided to the master.

3. A pipeline communication system comprising:
a master and a plurality of slaves configured to communicate with each other, each of the plurality of slaves comprising a memory, and being configured to generate a first ready signal and a second ready signal, wherein the first ready signal is configured to be provided only to the master and the second ready signal is configured to be provided only to each of the plurality of slaves, wherein the second ready signal is generated independent of an error check in each of the plurality of slaves;
wherein the first ready signal and the second ready signal are generated in response to completion of an operation in the system; and
wherein the second ready signal from each of the plurality of slaves is logically combined and is provided back to each of the slaves.

4. A method for use in a pipeline communication system, the method comprising:
generating a first ready signal and a second ready signal from each of the plurality of slaves, the plurality of slaves configured to communicate with a master and vice versa, each of the plurality of slaves comprising a memory; wherein the first ready signal is configured to be provided only to the master and the second ready signal is configured to be provided only to each of the plurality of slaves, wherein the second ready signal is generated independent of the error check in each of the plurality of slaves;

generating an abort signal from each of the plurality of slaves in response to a state when the first ready signal and the second ready signal are not in a same logic state; and providing the abort signal back to the plurality of slaves and wherein each of the plurality of slaves aborts the operation in response to the abort signal.

* * * * *